United States Patent [19]
Klein

[11] 3,745,463
[45] July 10, 1973

[54] CODED EQUALIZER

[75] Inventor: Theodore J. Klein, Navesink, N.J.

[73] Assignee: The United States of America as represented by the Secretary of the Army

[22] Filed: July 8, 1971

[21] Appl. No.: 160,671

[52] U.S. Cl. .................... 325/42, 235/183, 325/65, 333/28

[51] Int. Cl. .................... H04b 1/12

[58] Field of Search .................... 235/181, 183, 180; 333/18, 28, 70 R, 70 T; 325/42, 65, 38 R, 38 A; 178/69 R, 69 A; 328/167; 340/146.1 R, 146.1 AL

[56] References Cited

UNITED STATES PATENTS

| | | | |
|---|---|---|---|
| 3,489,848 | 1/1970 | Perreault | 33/28 X |
| 3,521,170 | 7/1970 | Leuthold et al. | 325/42 X |
| 3,596,267 | 7/1971 | Goodman | 325/42 X |
| 3,508,153 | 4/1970 | Gerrish et al. | 325/42 |
| 3,508,172 | 4/1970 | Kretzmer et al. | 333/18 |
| 3,553,606 | 1/1971 | Port | 333/28 |
| 3,597,541 | 8/1971 | Proakis et al. | 325/42 X |
| 3,154,678 | 10/1964 | Burns | 235/180 |
| 3,631,232 | 12/1971 | Perreault et al. | 325/42 X |

OTHER PUBLICATIONS

Genin: (Gaussean Estimates and Kalman Filtering. AGARDograph No. 139 published 2–1970, by Leondes, page 55.

Gersho: Adaptive Equalization of Highly Dispersive Channels Bell System Tech. Journal Jan. 1969. pages 55–77 Scientific Libr.

Ungerboeck: Nonlinear Detector for Binary Signals IBM Tech. Disclosure Bull. Vol. 13 No. 2 July 1970. p. 556/561.

*Primary Examiner*—Felix D. Gruber
*Attorney*—Harry M. Saragovitz, Edward J. Kelly et al.

[57] ABSTRACT

A digital information receiver having a tapped delay line equalizer for reducing intersymbol interference caused by a linear time dispersive transmission channel. The tapped delay line equalizer includes a plurality of amplifiers the gains of which are adjusted such that the combined response of the equalizer and channel approximates a multi-element coded digital signal which has the same number of levels as the signals to be transmitted, has the same number of elements as the channel response signal, and wherein the mean squared error between the combined channel and equalizer response signal and the channel response signal is a minimum. The output of the equalizer is connected to a decoder via a quantizer for decoding the transformed signal.

6 Claims, 7 Drawing Figures

INVENTOR.
THEODORE J. KLE

BY [signature] AGEN

Harry M. Saragovitz, Edward J. Kelly & Herbert Berl
ATTORNEYS

CODED EQUALIZER

The present invention relates to digital data transmission systems and more partcularly to digital receivers having coded equalizers for reducing intersymbol interference.

Those concerned with the development of data tramsission systems have long recognized the need for a simple but more effective device which reduces substantially intersymbol interference. For example, in digital communications systems a substantial amount of overlap distortion of the digital pulses is caused by the time dispersive characteristics of the transmission channel. It has been the general practice to reduce such distortion at the receiver with a tapped delay line equalizer which employs a tapped delay line, a series of variable gain elements and a summing circuit for providing equalization. Theoretically, such devices can approach total equalization of the distorted signal only as the number of taps approaches infinity.

The general purpose of this invention is to achieve a significant reduction in intersymbol interference with much shorter tapped delay lines than conventionally required. To do this the equalizer of the present invention has a unique transformation property such that the channel and the equalizer combined transform the information into a known coded signal which is later decoded. As a result, the equalizer of the present invention may have a significantly smaller number of taps than conventional equalizers which try to transform the dispersed signal directly into the original information.

Figure 1:
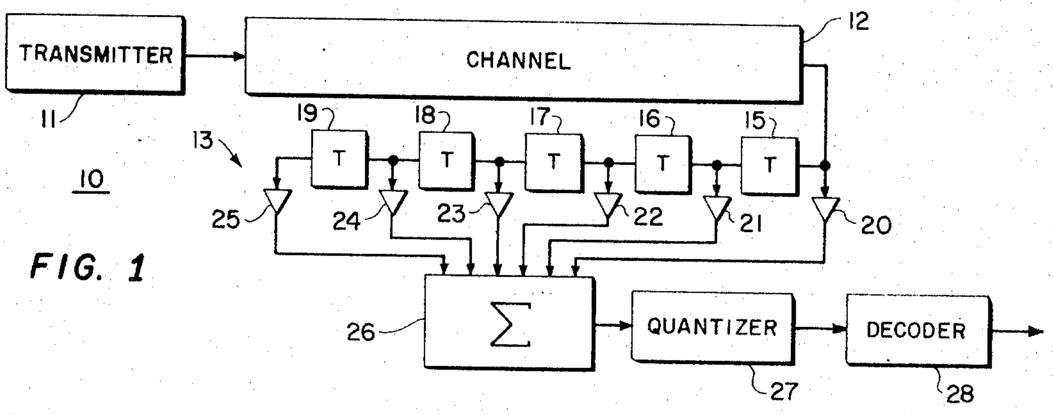

With these and other objects in view as will hereinafter more fully appear and which will be more particularly pointed out in the appended claims, reference is now made to the following description taken in connection with the accompanying drawings in which:

FIG. 1 represents a block diagram of the present invention; and

FIGS. *2a*, *2b*, *2d*, *2e*, *2f* and *2g* are a set of waveforms helpful in describing the invention of FIG. 1.

Referring now to the drawing there is shown in FIG. 1 a digital communication system 10 which includes a transmitter 11, a channel 12 and a receiver 13. For example, if the system 10 is a telegraph system, transmitter 11 might simply transmit a series of binary on-off voltages voltages over the channel 12 which may simply be a transmission line.

The receiver 13 includes a tapped delay line composed of five delays 15, 16, 17, 18 and 19 and six taps each of which has an amplifier 20, 21, 22, 23, 24 and 25 connected thereto. The instantaneous amplitudes of the outputs of amplifiers 20–25 are combined once during each band in a summer 26 the output of which is quantized by quantizer 27 having the output thereof connected to a decoder 28.

The operation of the device of FIG. 1 will now be described. In general, digital signals are generated in transmitter 11 and then transmitted over channel 12 where they are time dispersed. The delays 15–19 each delay the received signal for a time period equal to one baud. Each of the amplifiers 20–25 has the gain thereof preset in accordance with a rule which will be later specfied. The amplifier outputs are summed by summer 26 at one instant during each baud.

Figure 2A:
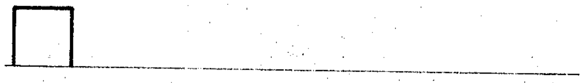
Figure 2B:
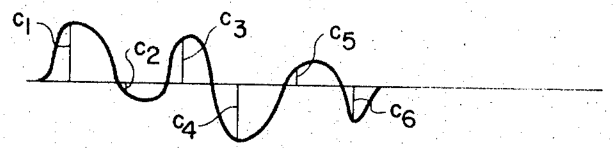

More specifically and with reference to the waveforms of FIG. 2, assume that the transmitter 11 is designed to transmit ternary digital signals over the channel 12 which time disperses the signals as shown in FIG. 2*b*. For example, assume that the single square pulse of FIG. 2*a* is time dispersed by channel 12 such that the signal of FIG. 2*b* appears at the output. Since the information is digital, the characteristics of the dispersed signal 2*b* may be completely defined by the six amplitudes $(c_1, c_2, c_3, c_4, c_5, c_6)$. In other words, the channel 12, in this example, is assumed to have time dispersive characteristics such that a single digital element will be dispersed over six bauds to produce a signal having six spaced amplitudes equal to $(c_1, c_2, c_3, c_4, c_5, c_6)$. Likewise, a negtative going square wave similar, but opposite in polarity, to the pulse of FIG. 2*a* will be dispersed by channel 12 over six bauds to produce a signal of opposite polarity as the signal in FIG. 2*b*. The channel 12 ouptut will now have amplitudes $(-c_1, -c_2, -c_3, -c_4, -c_5, -c_6)$.

Figure 2D:
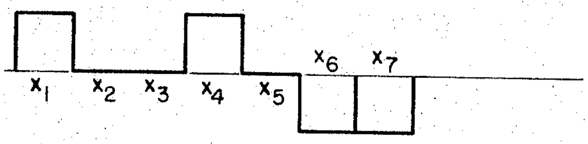
Figure 2E:
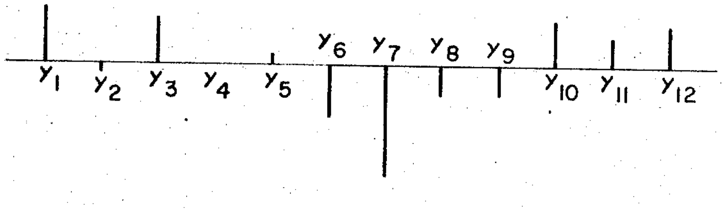

Finally, because the channel 12 is linear, thedispersion of a series of pulses which produce a signal at the channel 12 output which can be constructed from some linear combination of thechannel characteristics as defined by the signal of FIG. 2*b*. For exampel, if thetime dispersion of channel 12 is defined by the signal of FIG. 2*b* and the channel 12 is linear, then the dispersion of theseven element ternary signal of FIG. 2*d* will result ia signal which may becompletely defined by the 12 amplitudes ($Y_1$, $Y_2$, $Y_3$, $Y_4$, *Yhd 5*, $Y_6$, $Y_7$, $Y_8$, $Y_9$, $Y_{10}$, $Y_{11}$, $Y_{12}$) where the $Y$'s are linear combinations of the $c$'s. In this example, theproper linear combinations for the $y$'s may be calculated from a cyclic diagonal matrix C constructed from the $c$'s which will represent the linear transformation of the channel 12. If the amplitude values x of the signal of FIG. 2*d* are contructed as a column vector having the components $(+1, 0, 0, +1, 0, -1, 1)$ then calculation of the values of $y$ may be performed as follows:

$$\begin{bmatrix} c_1 & 0 & 0 & 0 & 0 & 0 & 0 \\ c_2 & c_1 & 0 & 0 & 0 & 0 & 0 \\ c_3 & c_2 & c_1 & 0 & 0 & 0 & 0 \\ c_4 & c_3 & c_2 & c_1 & 0 & 0 & 0 \\ c_5 & c_4 & c_3 & c_2 & c_1 & 0 & 0 \\ c_6 & c_5 & c_4 & c_3 & c_2 & c_1 & 0 \\ 0 & c_6 & c_5 & c_4 & c_3 & c_2 & c_1 \\ 0 & 0 & c_6 & c_5 & c_4 & c_3 & c_2 \\ 0 & 0 & 0 & c_6 & c_5 & c_4 & c_3 \\ 0 & 0 & 0 & 0 & c_6 & c_5 & c_4 \\ 0 & 0 & 0 & 0 & 0 & c_6 & c_5 \\ 0 & 0 & 0 & 0 & 0 & 0 & c_6 \end{bmatrix} \begin{bmatrix} 1 \\ 0 \\ 0 \\ 1 \\ 0 \\ -1 \\ -1 \end{bmatrix} = \begin{bmatrix} c_1 \\ c_2 \\ c_3 \\ c_4+c_1 \\ c_5+c_2 \\ c_6+c_3-c_1 \\ c_4-c_2-c_1 \\ c_5-c_3-c_2 \\ c_6-c_4-c_3 \\ -c_5-c_4 \\ -c_6-c_5 \\ -c_6 \end{bmatrix} = \begin{bmatrix} y_1 \\ y_2 \\ y_3 \\ y_4 \\ y_5 \\ y_6 \\ y_7 \\ y_8 \\ y_9 \\ y_{10} \\ y_{11} \\ y_{12} \end{bmatrix}$$

where the cyclic diagonal matrix represents the linear transformation C of the channel 12, the column vector on the left side represents the seven element transmitted signal $x$ of FIG. 2*d* and the column vector of the right represents the twelve values of the channel 12 output signal $y$ of FIG. 2*e*.

Extraction of the information from the twelve element dispersed signal $y$ of FIG. 2*e* has heretofore been accomplished by attempting to approach total equalization with a tapped delay line. In other words, the received signal is applied to an equalizer having a tapped delay line and a plurality of gain elements the outputs of which are summed, i.e., a device having a structure substantially the same as that shown by elements 15–26 of FIG. 1. However, in the prior art devices the values of the gains and the number of taps are selected such that the output of the summer 26 is a series of pulses having amplitudes as close as possible to the channel 12 input. Prior art equalizers attempt to transform the dispersed signal of FIG. 2*b* into a signal having only one prominent amplitude by enhancing one of the amplitudes, say $c_1$, and decreasing all the others, say $c_2$ to $c_6$, so that the combined response of the channel 12 and the equalizer will minimize the intersymbol interference.

In general, the overall response of the combined tapped delay line equalizer and the linear time dipsersive channel may be expressed as follows:

$$h_i = \sum_{j=1}^{N} c_j q_{i-j} \qquad i = 1, 2, \ldots, N+M-1$$

where $h$ is the set of spaced amplitudes at the output of the summer 26, the $c_j$ are the set of spaced amplitudes at the output of channel 12, the $q_{i-j}$ are the tap gains such as the gains of the amplifiers 20–25, $N$ is the number of bauds over which the test pulse of FIG. 2*a* is dispersed by the channel 12, and $M$ is the number of taps such as the number of amplifiers 20–26. In the present example $M$ equals six, $N$ equals six, $c$ equals the values $C_1$ to $C_6$ of FIG. 2*b*, and h is the set of spaced amplitudes which appear at the output of summer 26 as a result of transmitting the pulse of FIG. 2*a*.

Also, in general, the means squared error $E$ between the output $h$ of the equalizer, i.e., the output of summer 26, and some arbitrary set of values $v$ may be written as follows:

$$E = \frac{1}{N} \sum_{i=1}^{N} (h_i - v_i)^2$$

A purely mathematical minimization of $E$ with respect to Q may be performed using the last two equations to produce the following result:

$$\bar{q} = (C^T C)^{-1} C^T \bar{v}$$

where $C$ is a cyclic diagonal matrix of the elements $c$, $\bar{q}$ represents a vector whose components are equal to the amplifier gains, and $\bar{v}$ is a vector whose components are equal to some arbitrary set of values. This last equation states that for a given set of $c$'s, which define a specific channel response, one may construct a tapped delay line equalizer having a set of gains $\bar{q}$, such that the output $h$ of the equalizer is as close as possible to some arbitrary set of values $v$.

In the prior art devices, as explained above, the output h of the equalizer was intended to be as close as possible to the input which was a single pulse, so that the intersymbol interference is a minimum.

On the other hand, it is contemplated in the device of the present invention that for a given number of taps the gains of amplifiers 20 and 25 are chosen such that the combined channel and equalizer response $h$ approximate, not the channel 12 input of FIG. 2*a*, but a multi-element coded digital signal which has the same number of levels as the signals to be transmitted, has the same number of elements as the dispersed signal of FIG. 2*b*, and wherein the mean squared error between the coded signal and the signal of FIG. 2*b* is a minimum.

Figure 2F:
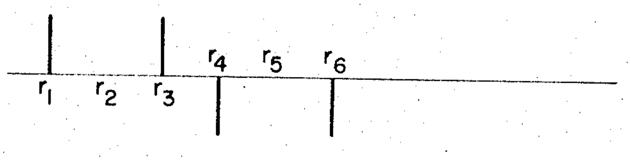
Figure 2G:
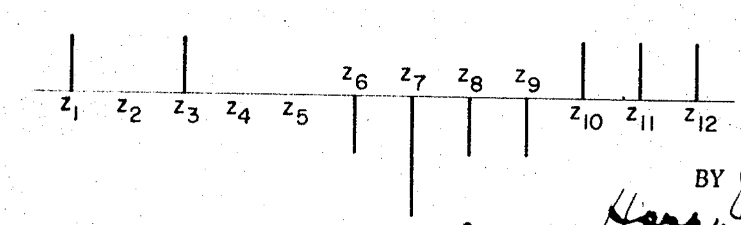

In the exemplifying waveforms of FIGS. 2*a*–2*g* the multi-element coded digital signal which meets all of the above specific conditions is represented by the six element ternary signal $r$ of FIG. 2*f* having the elements $r_1$, $r_2$, $r_3$, $r_4$, $r_5$ and $r_6$. Therefore, instead of attempting to minimize the intersymbol interference by transforming the signal of FIG. 2*b* into a signal which approximates a one and five zeros, the total intersymbol interference is controlled, such that the signal of FIG. 2*b* is transformed by the equalizer into a signal which is a close approximation of the signal $r$ of FIG. 2*f*. The signal $r$ of FIG. 2*f* is a ternary signal having six elements which, as close as possible approximates the signal of FIG. 2*b*. In other words, the mean squared error between the signal of FIG. 2*b*, as represented by the values $c_1$, $c_2$, $c_3$, $c_4$, $c_5$ and $c_6$, and the signal of FIG. 2*f*, as represented by the values $r_1$, $r_2$, $r_3$, $r_4$, $r_5$ and $r_6$ is a minimum.

Therefore, the arbitrarily defined response signal $v$ in the above equation is set equal to the multi-element coded digital signal $r$ of FIG. 2*f* and the gains $q$ of amplifiers 20–25 are now calculated according to the followijg expression:

$$\bar{q} = (C^T C)^{-1} C^T \bar{r}$$

Now, since the equalizer in the present invention will be transforming the dispersed test signal of FIG. 2*b* into a signal $r$ which is very close to itself, the number of taps required will be substantially less than the number required in prior art devices. In other words, the intersymbol interference is not removed but controlled. By controlling the intersymbol interference according to a known transformation a one-to-one correspondence between the output of summer 26 and the input to channel 12 will exist and can be determined. Therefore, a complete elimination of the intersymbol intereference can now be accomplished by simply decoding the output of summer 26 in the conventional quantizer 27 and decoder 28.

Using the example shown in FIG. 2 as a guide, a step-by-step procedure for determining the amplifier gains will now be summarized. The first step is to determine the channel 12 response by trasnmitting the test pulse of FIG. 2*a* over the channel 12 and measuring the $N$ amplitudes $C$ of the dispersed signal, where $N$ is the number of bauds over which the test pulse is dispersed. In the example of FIG. 2, $N$ is equal to six and the six amplitudes are $c_1$ to $c_6$. Next, calculate a set of $r$'s such that the following expression is a minimum:

$$E = \frac{1}{N} \sum_{i=1}^{N} (c_i - r_i)^2$$

where $E$ represents the mean squared error and the possible values of $r$ is $p$, where $p$ is the number of levels in the transmitted code. In the example of FIG. 2, $p$ is equal to three, since the transmitted code is ternary. Therefore, $r$ can assume the value of either +1, 0 or −1. Using the set of $r$'s just calculated, find the set of tap gains q from the following expression:

$$\bar{q} = (C^T C)^{-1} C^T \bar{r}$$

With the gains $q$ of amplifiers 20–25 set according to this equation, the transmitted signal will first be transformed by channel 12 into the signal $y$ and then transformed by the amplifiers 20–25 and summer 26 into the signal $z$. The values of the 2's and their significance can be determined as follows. In the example of FIG. 2, it is assumed that the set of $r$'s which minimizes E was calculated to be (+1, 0, +1, −1, 0, −1), which are the amplitudes of the signal of FIG. 2f. From these values of r and the response of channel 12 as defined by the values of c, which constitute the matrix C, the gains q of amplifiers 20–25 are calculated. Since the combined response of the channel 12 and the equalizer, up to the output of summer 26, is substantially defined by the r values, a matrix R can be constructed, which represents the combined linear transformation, as follows:

$$R=\begin{bmatrix} r_1 & 0 & 0 & 0 & 0 & 0 & 0 \\ r_2 & r_1 & 0 & 0 & 0 & 0 & 0 \\ r_3 & r_2 & r_1 & 0 & 0 & 0 & 0 \\ r_4 & r_3 & r_2 & r_1 & 0 & 0 & 0 \\ r_5 & r_4 & r_3 & r_2 & r_1 & 0 & 0 \\ r_6 & r_5 & r_4 & r_3 & r_2 & r_1 & 0 \\ 0 & r_6 & r_5 & r_4 & r_3 & r_2 & r_1 \\ 0 & 0 & r_6 & r_5 & r_4 & r_3 & r_2 \\ 0 & 0 & 0 & r_6 & r_5 & r_4 & r_3 \\ 0 & 0 & 0 & 0 & r_6 & r_5 & r_4 \\ 0 & 0 & 0 & 0 & 0 & r_6 & r_5 \\ 0 & 0 & 0 & 0 & 0 & 0 & r_6 \end{bmatrix}$$

It is pointed out that the total response is not exactly equal to *r* but only approaches r as the number of amplifiers 20–25 gets arbitrarily large. However, for a relatively small finite number of amplifiers 20–25, the channel response will become very close to *r*. Using the values of *r* in FIG. 2*f* as defining the total response from the input to channel 12 to the output of summer 26, the output of the summer 26 corresponding to the transmitted signal *x* of FIG. 2*d* will be the signal *z* of FIG. 2*q*. The values of *z* can be calculated from the equation, $$R\bar{x}=\bar{z}\ ,$$

or more specifically, $$\begin{bmatrix} 1 & 0 & 0 & 0 & 0 & 0 & 0 \\ 0 & 1 & 0 & 0 & 0 & 0 & 0 \\ 1 & 0 & 1 & 0 & 0 & 0 & 0 \\ -1 & 1 & 0 & 1 & 0 & 0 & 0 \\ 0 & -1 & 1 & 0 & 1 & 0 & 0 \\ -1 & 0 & -1 & 1 & 0 & 1 & 0 \\ 0 & -1 & 0 & -1 & 1 & 0 & 1 \\ 0 & 0 & -1 & 0 & -1 & 1 & 0 \\ 0 & 0 & 0 & -1 & 0 & -1 & 1 \\ 0 & 0 & 0 & 0 & -1 & 0 & -1 \\ 0 & 0 & 0 & 0 & 0 & -1 & 0 \\ 0 & 0 & 0 & 0 & 0 & 0 & -1 \end{bmatrix} \begin{bmatrix} 1 \\ 0 \\ 0 \\ 1 \\ 0 \\ -1 \\ -1 \end{bmatrix} = \begin{bmatrix} 1 \\ 0 \\ 1 \\ 0 \\ 0 \\ -1 \\ -2 \\ -1 \\ -1 \\ 1 \\ 1 \\ 1 \end{bmatrix}$$

Of course, since the linear transformation *R* is a digital code generator, i.e., it transforms a digital signal, the input signal *x*, into another digital signal, the output signal *z*, according to a known digital code, then extracting the original signal *x* can be performed by a simple digital decoder. For a small number of code elements, the decoder could perform a table look-up. It is again pointed out that the output signal *z* and the linear transformation *R* only approach a digital format. For this reason, the quantizer 27 is employed to convert the output signal *z* into a pure digital signal by quantizing the amplitudes.

It is further pointed out that since the total response *R* forms a digital code generator, it may also be chosen to have the additional feature of being an error correcting code generator. As a matter of fact, the actual code used in the example and shown in FIG. 2*f* is an error correcting Fire Code which can correct single errors and double adjacent errors per 12-digit block. In this case, decoder 28 would be an error correcting decoder.

Many modifications are contemplated and may obviously be resorted to by those skilled in the art without departing from the spirit and scope of the invention, as hereinafter defined by the appended claims, as only a preferred embodiment thereof has been disclosed.

What is claimed is:

1. In a digital communication system having a digital transmitter means for transmitting a digital signal and coupled to a digital transmission channel which time disperses said transmitted digital signal according to a known response between the channel input and output, a digital receiver coupled to the output of said channel, said receiver comprising:

a tapped delay line having an input and a plurality of tap outputs and wherein the time delay between successive ones of said tap outputs is equal to one baud;

a plurality of gain means each connected to one of said tap outputs;

the gains of said gain means having values such that, the combined channel and receiver response is substantially a multi-element coded digital signal, and the mean squared error between said channel response and said combined channel and receiver response is a minimum;

summing means connected to the output of said gain means for summing the instantaneous amplitudes of said outputs of said gain means once during each said baud;

quantizer means connected to the output of said summing means for converting the output thereof into a digital signal by quantizing the amplitudes of the output of said summing means; and digital decoder means connected to the output of said quantizer means for converting the output of said quantizer means into said transmitted digital signal.

2. The system according to claim 1 and wherein said values of said gains are such that the number of digital elements in said channel response and said combined channel and receiver responses are equal.

3. The system according to claim 2 and wherein said values of said gains are such that the number of levels in said transmitted digital signal and said combined channel and receiver response are equal.

4. The system according to claim 3 and wherein said values of said gains are such that the elements of said coded digital signal are the elements of an error correcting code.

5. The system according to claim 1 and wherein the channel response is such that a single digital element is dispersed over n bauds according to a linear transformation represented by a matrix *C*; and said values of said gains, represented by a vector $\bar{q}$, are such that said coded digital signal has *n* digital elements represented by the vector $\bar{r}$ and the following relationship is satisfied:

$$\bar{q}=(C^TC)^{-1}C^T\bar{r}.$$

6. The system according to claim 5 and wherein said values of said gains are such that the number of levels in said transmitted digital signal and said coded digital signal are equal.

* * * * *